United States Patent [19]

Hutter

[11] Patent Number: 4,589,622
[45] Date of Patent: May 20, 1986

[54] ADJUSTABLE SUPPORT LEGS
[76] Inventor: Donald J. Hutter, P.O. Box 7372, Everett, Wash. 98201
[21] Appl. No.: 676,164
[22] Filed: Nov. 29, 1984
[51] Int. Cl.⁴ .................................................. F16M 13/00
[52] U.S. Cl. ................................ 248/649; 248/188.5; 248/354.4; 248/413; 248/676; 403/362
[58] Field of Search .................. 248/188.5, 354.4, 157, 248/161, 413, 132, 669, 677, 676, 649; 403/109, 362

[56]  References Cited
U.S. PATENT DOCUMENTS

| | | | |
|---|---|---|---|
| 994,598 | 6/1911 | Martin | 248/157 |
| 1,661,868 | 3/1928 | Armstrong et al. | 248/413 X |
| 1,972,654 | 9/1934 | Heath | 248/676 X |
| 2,521,920 | 9/1950 | Koch | 248/676 X |
| 2,665,938 | 1/1954 | McCrossen | 248/188.5 X |
| 2,989,329 | 6/1961 | Noah | 248/188.5 X |
| 3,642,242 | 2/1972 | Danekas | 248/354.4 |
| 4,216,933 | 8/1980 | Cramer | 248/188.5 |

OTHER PUBLICATIONS

*VENTILATION*, Published by the Fire Service Training Program, Commission for Vocational Education, Olympia, Washington, Reprint 1976, pp. 1-22.

*Primary Examiner*—J. Franklin Foss
*Assistant Examiner*—David L. Talbott
*Attorney, Agent, or Firm*—Ward Brown; Robert W. Beach

[57]  ABSTRACT

Sturdy legs are normally retracted into the housing of an otherwise conventional smoke ejector but are extendable in various adjusted positions to support the ejector freestanding on a supporting surface.

5 Claims, 7 Drawing Figures

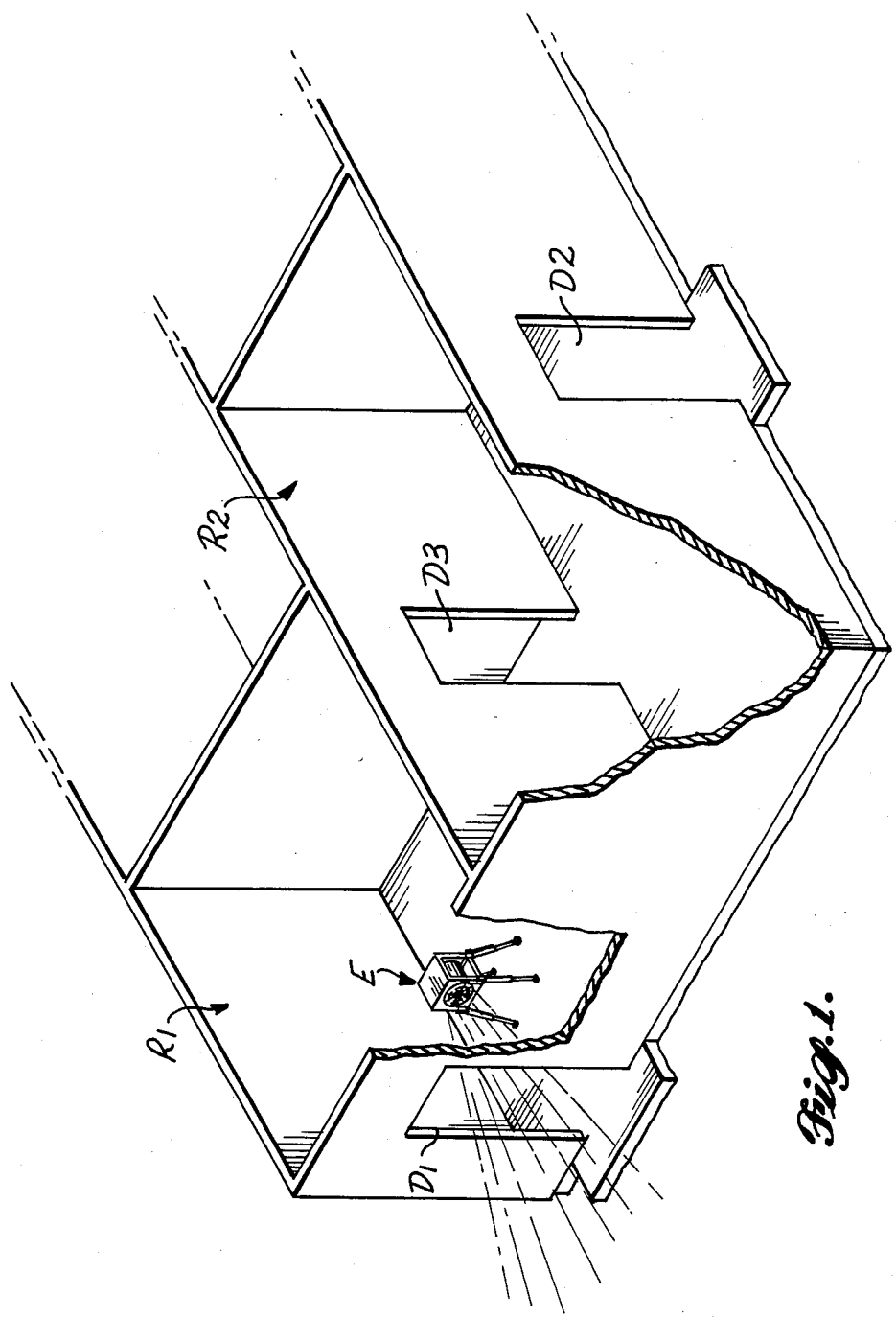

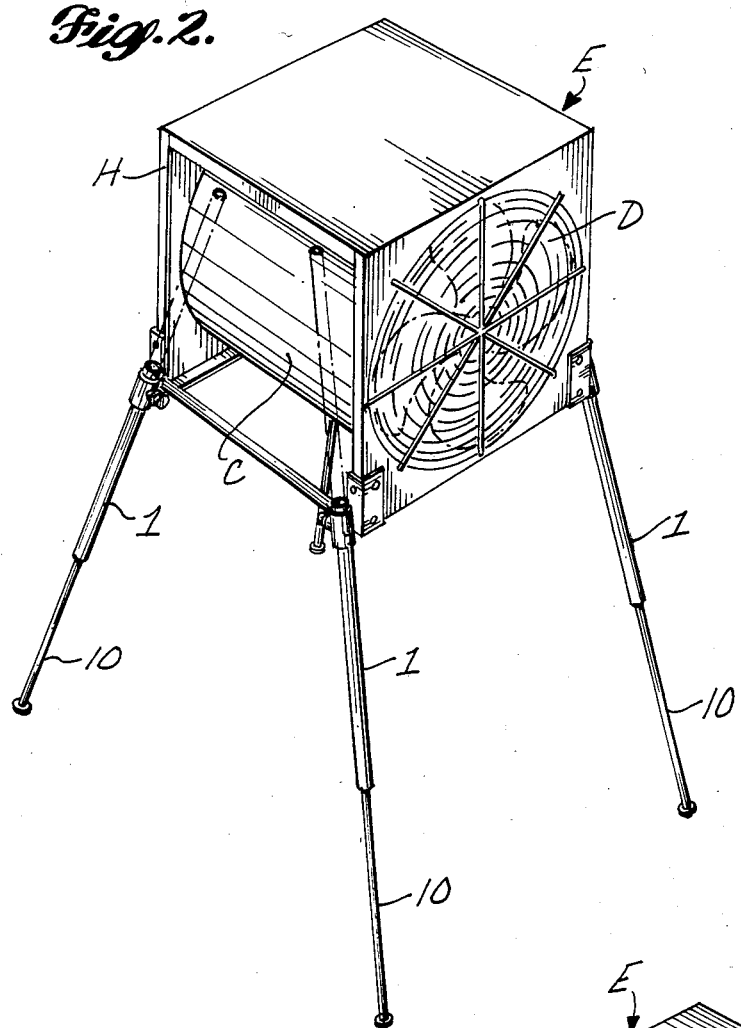
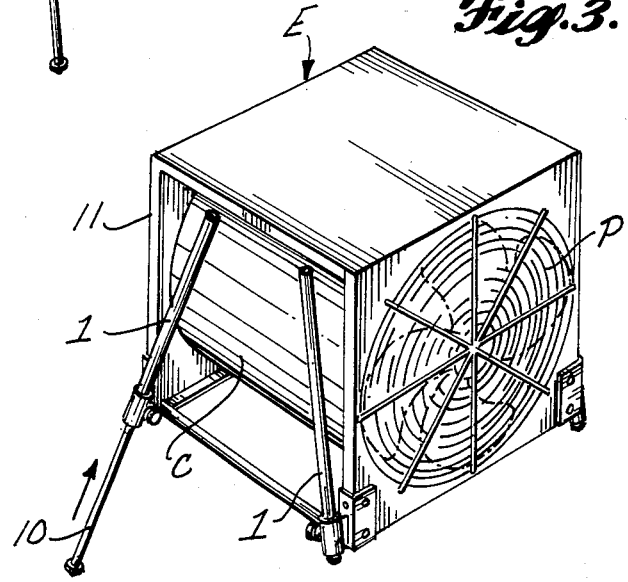

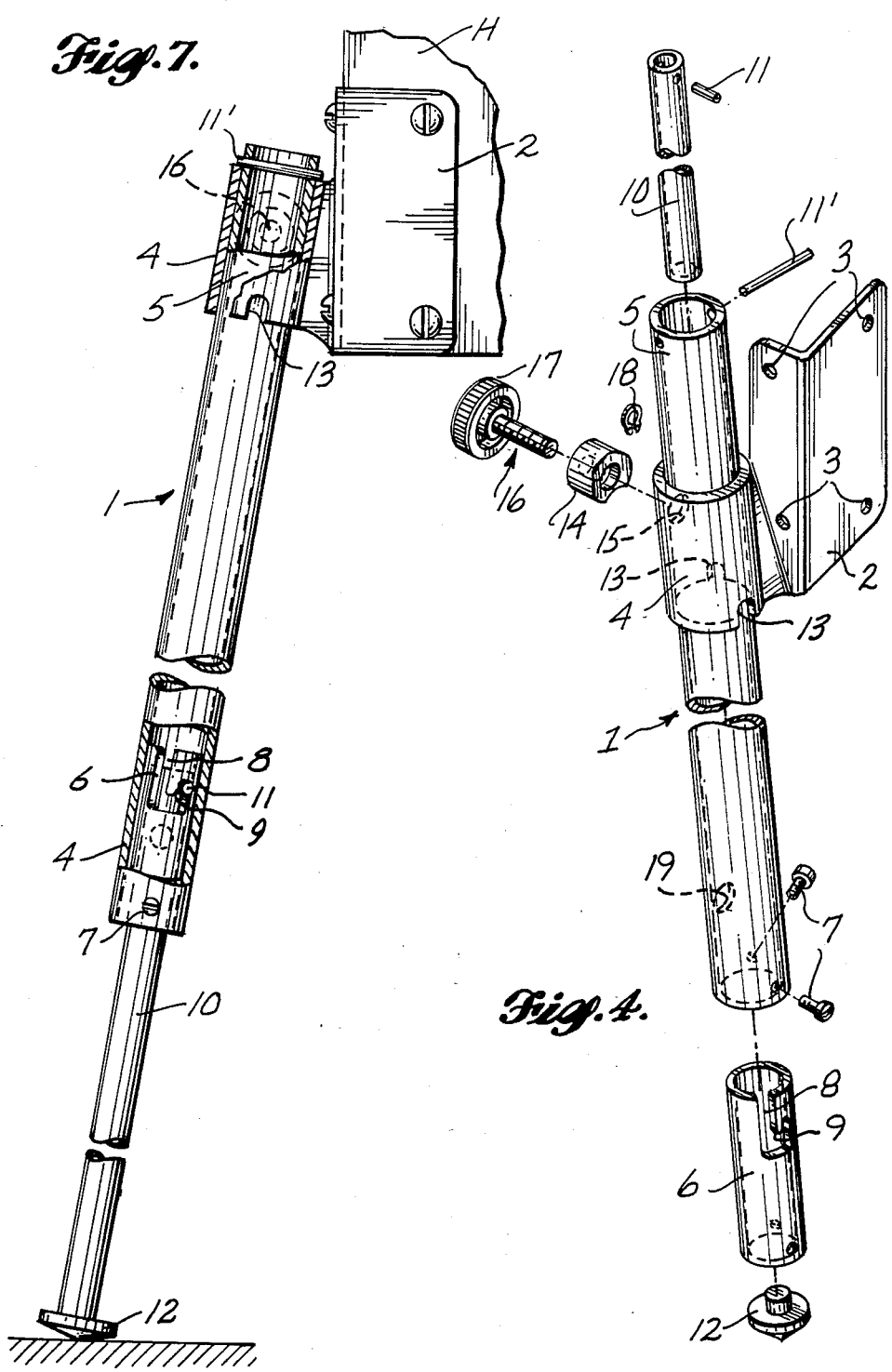

ADJUSTABLE SUPPORT LEGS

BACKGROUND OF THE INVENTION

1. Field of the Invention

The present invention relates to mechanism for supporting an article freestanding and, more specifically, to such mechanism for a supporting a high volume fan or blower of the type commonly known by firefighters as a "smoke ejector".

2. Prior Art

As described in the publication entitled *Ventilation*, published by the Fire Service Training Program of the Washington State Commission for Vocational Education (1976), electric smoke ejectors are useful in discharging smoke to ventilate a burning building rapidly. Rapid ventilation aids rescue by enabling firefighters to enter the building promptly, thereby saving lives, and permits quicker location of the fire which shortens the time required to extinguish the fire and reduces fire, smoke and water damage. The suggested placement for such a smoke ejector is in or closely adjacent to a window or a door or an opening in the floor or ceiling

SUMMARY OF THE INVENTION

The principal object of the present invention is to provide novel mechanism for supporting an article freestanding, particularly mechanism attachable to a smoke ejector that allows it to be spaced any desired distance above a supporting surface within wide limits and thereby facilitates deployment of the smoke ejector in a position contributing to its ventilating effectiveness.

It also is an object to provide such support mechanism in compact form, so as not to interfere with transport or storage of the smoke ejector, and quick and easy to use, for prompt set up of the smoke ejector.

In the preferred embodiment of the present invention, a special support usable with an otherwise conventional smoke ejector includes sturdy legs normally retracted into the ejector housing, but extendable in various adjusted positions to support the ejector freestanding on a supporting surface.

BRIEF DESCRIPTION OF THE DRAWINGS

FIG. 1 is a diagrammatic top perspective of a building structure with parts broken away, illustrating the use of a smoke ejector having support mechanism in accordance with the present invention for ventilating the building structure.

FIG. 2 is a top perspective of a smoke ejector having support mechanism in accordance with the present invention; and FIG. 3 is a corresponding top perspective with parts of the support mechanism in different positions.

FIG. 4 is an enlarged, partially exploded, top perspective of support mechanism in accordance with the present invention.

FIG. 7 is a front elevation corresponding to FIG. 6 with parts broken away and parts shown in section, showing the support mechanism in fully extended position.

DETAILED DESCRIPTION

Figures 5, 6:
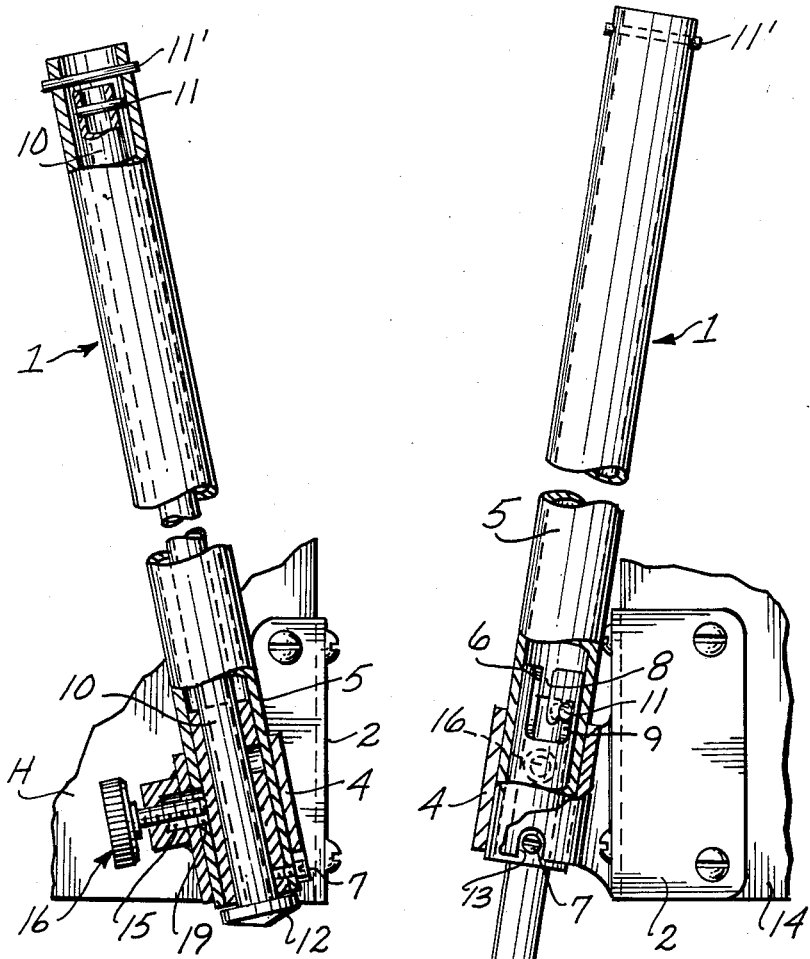
FIG. 5 is a front elevation of support mechanism in accordance with the present invention with parts broken away and parts shown in section, showing such support mechanism in retracted position.
FIG. 6 is a side elevation of the support mechanism of FIG. 5 with parts broken away and parts shown in section, showing such support mechanism in partially extended position.

The present invention is concerned with increasing the effectiveness of a smoke ejector to empty a building structure of smoke. Conventionally it has been proposed that a smoke ejector be mounted in a door or a window or in an opening through a ceiling or a floor. I have found, however, that the effectiveness of a smoke ejector in ventilating a building structure can be affected substantially by the location of the ejector.

Experiments on different placements of a smoke ejector were conducted for a srructure similar to the structure shown diagrammatically in FIG. 1. Such structure includes adjacent rooms R1 and R2 having exterior doors D1 and D2, respectively, and a door D3 connecting the two rooms. For each experiment the smoke ejector E was positioned to blow air out through door D1. To assess the ventilating effectiveness of the ejector, the velocity of air entering through about the center of door D2 was measured.

When the ejector was mounted in the opening of door D1, as recommended by the prior art, it was found that the velocity of air entering through door D2 was substantially slower than when the ejector was positioned in the position inward of door D shown in FIG. 1. The smoke ejector preferably is approximately centered in the door opening and is a substantial distance, preferably 6 to 8 feet, inside the room R1 from the opening of door D1. Increase in the overall flow of air through the two rooms may be caused by one or the other or both of the door openings acting as a venturi. My invention resides in providing mechanism for quickly and conveniently supporting an article such as a standard smoke ejector freestanding on a supporting surface and spaced above such surface a desired distance.

As shown in FIGS. 2 and 3, the invention consists in adjustable and retractable legs 1 usable with an otherwise conventional smoke ejector E, such as the ½ horsepower, 1725 rpm, model P164S smoke ejector manufactured by Super Vacuum Manufacturing Co., Inc., of Loveland, Colorado. Such ejector has an electric motor driving a bladed propeller P and mounted in a cylindrical casing C. The casing is carried inside a cubical housing H open at the sides to expose the casing C. In their fully extended positions shown in FIG. 2, the legs are inclined outward and downward from the housing H to support the ejector above the supporting surface at a maximum height substantially greater than the height of the ejector housing. The angle of the legs and their compact, multisection construction assure that they can fit inside the fan housing alongside the blower casing when retracted as illustrated in FIG. 3, so as not to interfere with transport or storage of the ejector.

The details of the preferred leg construction are best seen in FIG. 4. An angle bracket 2 has mounting holes 3 to adapt the bracket for mounting on a lower corner of the ejector housing. A cylindrical collar 4 is welded to one flange of bracket 2 in an outward and downward inclined orientation. A top tubular leg section 5 fits closely inside the collar 4 for axial sliding in the collar.

A cylindrical insert 6 is press-fitted in the lower end portion of the bore of the top leg section 5 and is retained with its bottom end substantially flush with the bottom end of such top leg section by screws 7. The heads of such screws extend outward beyond the outer circumference of the top leg section 5 to act as positioning posts as described below. The upper end portion of the insert has a bayonet slot including a lengthwise portion 8 and an undercut circumferential portion 9.

A bottom leg section 10 is inserted downward into the bore of the top leg section 5 and through the insert 6. The upper end portion of such bottom section 10 carries a cross pin 11 fittable in the bayonet slot 8, 9 of the insert. A cap 12 can be secured to the bottom of such bottom leg section.

After assembly of the two leg sections, an additional cross pin 11' is fitted diametrically through the top end portion of the top leg section to prevent withdrawal of the bottom leg section 10 upward out of the top leg section 5. Such additional pin also projects outward beyond the outer periphery of the top leg section so as to limit downward sliding movement of the top leg section 5 by engagement of such pin 11' against the top edge of the collar 4. When the top leg section is fully retracted, upward from the position shown in FIG. 4, the heads of the screws or posts 7 can engage in locating notches 13 in the bottom end portion of the collar and prevent additional retraction or turning of the bottom leg section relative to the collar.

A clamping screw mounting block 14 having an internally threaded, through bore is welded to one side of the collar 4 with its bore in registration with a hole 15 through the collar. A clamping screw 16 having an enlarged knurled head 17 is screwed through the block 14 so that its inner end portion projects through the collar hole 15. A clip 18 can be provided to prevent withdrawal of the clamping screw from the threaded bore of block 14.

Hole 15 through the collar registers with a hole 19 through the top leg section 5 when such top leg section is fully retracted, upward from the position shown in FIG. 4, with the heads of the screws or posts 7 received in the locating notches 13 in the bottom end portion of collar 4.

In the fully retracted position of the leg shown in FIG. 5, the clamping screw 16 is rotated to project through the registered holes 15 and 19 in the collar 4 and top leg section 5 so as to engage against the bottom leg section 10 and prevent its extension. Such screw can be turned to release the bottom leg section, while still projecting through the hole 19 of the top leg section to prevent extension of the top leg section. This allows the bottom leg section to be extended and clamped at any intermediate position, or it can be fully extended to the position shown in FIG. 6 where its cross pin 11 is slid downward through the lengthwise slot portion 8 of the insert 6. The bottom leg section can be rotated, counterclockwise as viewed in FIG. 6, to move pin 11 into the undercut portion 9 of the bayonet slot so that the bottom leg section cannot be moved upward without first being rotated back to move the pin into the vertically elongated portion 8 of the bayonet slot.

To shift the top leg section to the fully extended position shown in FIG. 7, the clamping screw 16 is loosened to remove its inner end from the hole 19 of the top leg section. The top leg section can slide downward through the collar and be clamped in any intermediate position, or it can be fully extended until its cross pin 11' engages against the upper end of the collar. The adjustment screw then can be tightened to bear against the top leg section and thereby prevent its retraction.

Consequently, the improved ejector having support legs in accordance with the present invention can be stored and transported with the legs retracted without additional space or inconvenience, and can be quickly and easily deployed freestanding at a desired height and location in a building structure without additional tools or equipment or loss of time.

I claim:

1. An adjustable leg for use in supporting an article freestanding comprising a bracket adapted to be secured to the article in fixed position and having a collar with a central bore, a first elongated hollow leg section slidable lengthwise through said bore of said collar to adjust the effective length of said first leg section, a second elongated leg section slidable in said first leg section, means for locking said second leg section in fixed position relative to said first leg section but releasable to permit sliding movement of said two leg sections, and releasable clamping means, separate from said locking means, carried by said collar for bearing against the outer periphery of said first leg section so as to lock said first leg section in fixed position relative to said collar, said first leg section having a radial opening positionable, with said clamping means released, in alignment with said clamping means and said clamping means being optionally actuatable so as to extend through said radial opening and bear against the outer periphery of said second leg section to lock said second leg section in fixed position relative to said collar.

2. The adjustable leg defined in claim 1, in which the clamping means includes a clamping screw threaded through the collar, turnable to bear against the outer periphery of the first leg section when its radial opening is offset from said screw, and turnable to bear against the outer periphery of the second leg section when the radial opening of the first leg section is aligned with said screw.

3. The adjustable leg defined in claim 1, including guide means for positioning the first leg section with its radial opening in alignment with the clamping screw.

4. The adjustable leg defined in claim 3, in which the guide means includes a post projecting from the first leg section and a locating slot in the collar, said post and slot being located so as to interfit by lengthwise sliding movement of the first leg section in the collar as the radial opening of the first leg section approaches alignment with the clamping means.

5. An adjustable leg for use in supporting an article freestanding comprising a first upright elongated hollow leg section, a second upright leg section fitted in said first leg section and extendable therefrom and retractable therein, means for locking said second leg section relative to said first leg section with said second leg section extended so as to prevent retraction of said second leg section but releasable so as to permit such retraction, a bracket adapted to be secured to the article in fixed position and having a collar with an upright central bore receiving said first leg section for lengthwise sliding of said first leg section in said bore, and releasable clamping means carried by said collar for bearing against the outer periphery of said first leg section so as to lock said first leg section in fixed position relative to said collar, said first leg section having a radial opening in its bottom end portion positionable, with said clamping means released, in alignment with said clamping means and said clamping means being actuatable so as to extend through said radial opening and bear against the outer periphery of said second leg section to lock both said first and second leg sections in fixed positions relative to said collar, whereby the aggregate effective length of said two leg sections can be infinitely adjusted through a first range by use of said clamping means and through a second range by use of said locking means and said clamping means.

* * * * *